Jan. 15, 1929.                    1,698,933

M. A. CHARTIER

GAS BREAD TOASTER

Filed Dec. 29, 1927

Inventor

Michael A. Chartier

By Mason Fenwick & Lawrence

Attorneys

Patented Jan. 15, 1929.

1,698,933

UNITED STATES PATENT OFFICE.

MICHEL A. CHARTIER, OF ROXBURY, MASSACHUSETTS.

GAS BREAD TOASTER.

Application filed December 29, 1927. Serial No. 243,346.

This invention relates to improvements in toasters, particularly of a type which may be used in co-operation with a gas stove for toasting bread and the like.

A prime object of this invention is to provide a gas bread toaster having structural means for uniformly distributing heat from the gas flame for toasting purposes and eliminating the possibility of the flame coming in direct contact with the bread or other article being toasted.

A further object of this invention is to provide an efficient means for holding the bread or other article in toasted relationship to the device.

Other objects of this invention will appear from the following detailed description and as disclosed in the single sheet of drawings, which is herewith made a part of this application.

In the drawings—

Figure 1 illustrates a perspective view of a gas range heater in cooperative relationship with the gas bread toaster according to this invention.

Figure 2 presents a bottom plan view of the toaster disclosing the openings through which the heat or flame is adapted to easily circulate.

Figure 1:
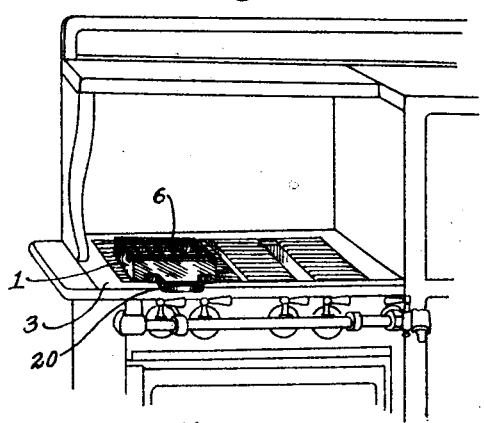
Figure 4:
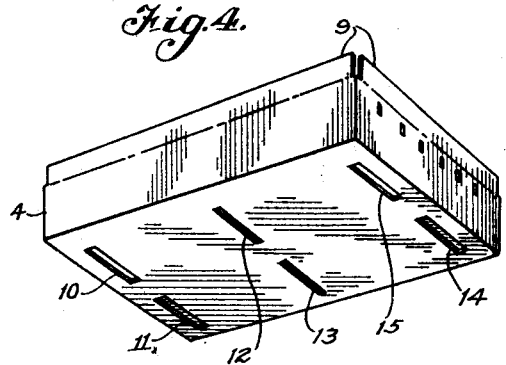
Figure 4 illustrates a bottom perspective view of the toaster disclosing particularly the openings in the bottom of the plate.
Figure 2:
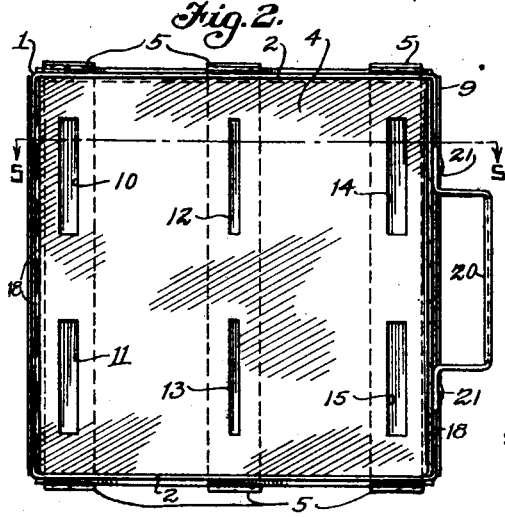
Figure 3:
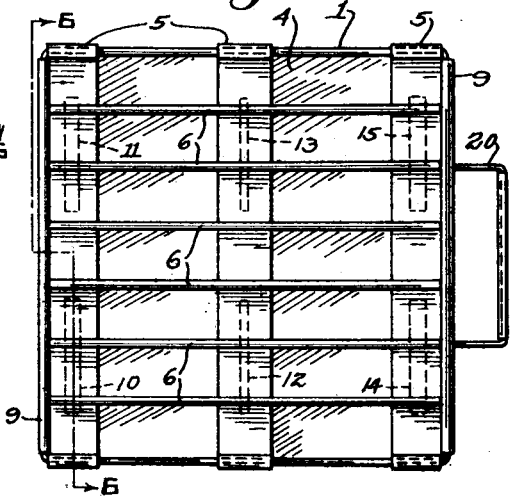
Figure 3 illustrates a top plan view of the toaster disclosing the supporting rods or bars for the bread and deflecting plates properly located above the openings in the bottom plate.

In the gas bread toaster, according to this invention, it is preferred that numeral 1 designate a main body portion of the toaster, made of any suitable material, such as sheet metal, and formed into the desired shape. The lower peripheral edge 2 of the main body portion 1 is adapted to rest upon the heating surface 3 of a gas range, or other heating source in the usual manner, as disclosed in Figure 1. The sides of the main body portion or framework of the toaster 1 are of sufficient height to accommodate therebetween a heated plate or surface 4, deflecting strips 5 and supporting bars 6 for the bread or other article to be toasted. The heating plate 4 may be made of any suitable material, such as sheet metal and is adapted to be located a proper distance above the lower peripheral edge 2 of the main body portion 1, so as to allow space for the free action of the gas flame or other source of heat before contacting therewith.

The plate 4 is constructed having integrally formed therewith around its edges extensions 7 which are adapted to extend upwardly along the inside surface of the main body portion 1 a suitable distance and then outwardly over the upper edge portions 8 of the main body portion 1, as clearly disclosed at 9, thereby functioning to position the heating plate 4 a proper distance between the lower edge 8 and upper edge 8 of the main body portion 1 and, at the same time, provides an efficient re-enforcing and supporting means for the heated plate 4 which, in operation, is subjected to severe expansion and contraction effects due to excessive heating and cooling thereof. The plate 4 may be of any type of structure suitable for the purpose. For instance, when in position, it may be in the shape of a pan, as clearly disclosed in the drawings which are a part of this application, wherein the upper edges 9 of the pan are bent over the upper edges 8 of the frame 1 and placed or hammered firmly together, when they may be, for additional strength, punched at intervals, thereby making a strong and rigid construction which will function to retain a large proportion of the heat for toasting the bread. The main purpose of the pan 4 is to prevent the flame from coming in contact with the bread. In order to aid in uniformly spreading the heat for toasting the bread, it is preferred in this invention to provide a plurality of openings 10, 11, 12, 13, 14 and 15 in the plate 4, through which the heat or flame may easily circulate, the middle openings 12 and 13 are somewhat smaller because the heat ordinarily is more intense at that point.

For the purpose of spreading the heat uniformly as it flows upwardly through the openings in the bottom of the pan 4, a plurality of strips 5 are provided which may be made of any proper material, such as sheet metal, and of such width to overlap the openings in the pan 4. The strips 5 are positioned above the openings in the pan 4 and in spaced relationship thereto and are of sufficient length so that they may be bent upwardly at the free ends and outwardly over the turned edges of the pan 4 and punched and hammered in that position in order to assure firmness. As one form of construction, the two end strips may be located having their outer longitudinal edges against the sides of the pan 4, thereby functioning to cause the heat circulating through the openings 10, 11, 14 and 15 to be deflected toward the center of the toaster. The middle strip located above the openings 12 and 13 causes the heat to be deflected evenly and laterally thereto, thereby producing an even heat throughout the toaster, making a golden brown toast which is crisp and entirely treated.

Figure 5:
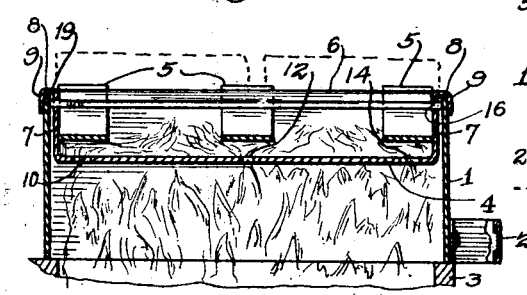
Figure 5 illustrates a sectional view of Figure 2 taken along line 5—5.
Figure 6:
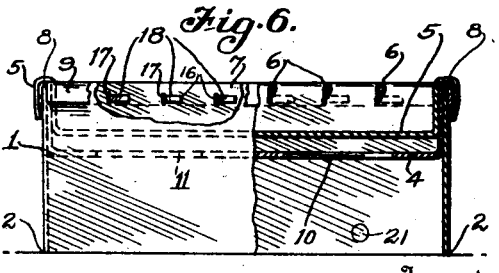
Figure 6 represents a sectional view of Figure 3 taken along line 6—6 with a portion broken away in order to disclose the means for holding the end bars in position.
Figure 7:
Figure 7 illustrates a fragmentary perspective view of a supporting strip for the plate, showing in broken lines the method for interlocking the supporting strip with the main body portion of the toaster by means of bending the free ends.

As one means of supporting the bread or other article to be treated and toasted, narrow metal bars or strips 6 are made of any suitable material, such as sheet metal, and folded into proper shape so as to make them strong and rigid, as clearly disclosed in Figure 7, wherein the strip 6 is provided with a turned over portion 16. The strips 6 are run laterally of the sides of the main body portion 1 and even with the top of the toaster, where the bread is deposited for treatment. The strips or bars 6 are properly spaced apart, their free ends of sufficient length so that when extended through openings 17 in the sides 7 of the pan 4 adjacent the sides of the main body portion 1, they may be bent over, thereby being brought into firm interlocked relationship with the different portions of the toaster, as clearly disclosed in Figures 5 and 6 at 18 and 19, it being understood that the turned over edges 9 of the pan 4 aid in firmly holding the strip 6 in position. As means for readily removing the toaster from place to place, a handle element 20 is provided, which may be fastened in any suitable manner to the main body portion 1 of the toaster, as by rivets 21.

The gas bread toaster provided by this invention is simple and inexpensive in structure and provides a novel and efficient means for uniformly distributing the heat for toasting purposes without allowing the flame of the gas jet or other source of heat to come in direct contact with the bread. This is accomplished primarily by the provision of openings in the heating plate or pan and deflecting elements above the openings and spaced from the plate in such a manner that the heat will tend to be deflected toward the center of the toaster and where it is mostly needed for the purpose of producing a golden brown toast.

It is to be understood that substitutions and alterations may be made in the above disclosure, including the drawings, within the scope of the appended claims without affecting the merits of this invention.

What I claim is:

1. A toaster comprising a main body portion, a plate adapted to be heated supported by the main body portion, openings in the plate through which heat may pass, heat deflecting members spaced from the openings, means for supporting the article to be toasted, the support for the plate consisting of sections thereof extending over the edges of the main body portion, the deflecting strips being supported at each end by sections thereof extending over the suitable edges of the toaster.

2. A toaster comprising a main body portion, a plate adapted to be heated supported by the main body portion, openings in the plate through which heat may pass, heat deflecting members spaced from the openings, means for supporting the article to be toasted, the support for the plate consisting of sections thereof extending over the edges of the main body portion, the deflecting strips being supported at each end by sections thereof extending over the suitable edges of the toaster, the deflecting strips being arranged in spaced relationship to the plate in such a manner as to uniformly distribute the heat through the openings.

In testimony whereof I affix my signature.

MICHEL A. CHARTIER.